US007887316B2

(12) United States Patent
Cox

(10) Patent No.: US 7,887,316 B2
(45) Date of Patent: Feb. 15, 2011

(54) SELECTIVE LASER SINTERING POWDER RECYCLE SYSTEM

(75) Inventor: Brian David Cox, Round Rock, TX (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 12/394,573

(22) Filed: Feb. 27, 2009

(65) Prior Publication Data

US 2009/0169664 A1    Jul. 2, 2009

Related U.S. Application Data

(63) Continuation of application No. 11/077,304, filed on Mar. 9, 2005, now abandoned.

(51) Int. Cl.
  B29B 7/66      (2006.01)
  B29B 17/00     (2006.01)
  B28B 17/00     (2006.01)
(52) U.S. Cl. ............... 425/215; 425/217; 425/174.4; 425/375; 264/308; 264/497
(58) Field of Classification Search ............. 425/174.4, 425/375, 215, 217; 264/113, 308, 401, 497
See application file for complete search history.

(56) References Cited

U.S. PATENT DOCUMENTS

| | | | |
|---|---|---|---|
| 3,608,001 A | 9/1971 | Kowalski et al. | |
| 3,791,341 A | 2/1974 | Diamond et al. | |
| 3,801,869 A * | 4/1974 | Masuda | 361/227 |
| 4,247,508 A | 1/1981 | Housholder | |
| 4,615,648 A | 10/1986 | Merz | |
| 4,863,538 A | 9/1989 | Deckard | |
| 4,944,817 A | 7/1990 | Bourell et al. | |
| 5,132,143 A | 7/1992 | Deckard | |
| 5,647,931 A | 7/1997 | Retallick et al. | |
| 5,733,497 A | 3/1998 | McAlea et al. | |
| 5,814,255 A | 9/1998 | Weiser et al. | |
| 5,817,206 A | 10/1998 | McAlea et al. | |
| 5,902,537 A | 5/1999 | Almquist et al. | |

(Continued)

FOREIGN PATENT DOCUMENTS

DE    20107262    8/2001

(Continued)

OTHER PUBLICATIONS

European Search Report for European Application No. EP06004819.

(Continued)

*Primary Examiner*—Maria Veronica D Ewald
(74) *Attorney, Agent, or Firm*—Ralph D'Alessandro; Keith A. Roberson

(57) ABSTRACT

A method and apparatus for forming three-dimensional objects by laser sintering that includes the use of dense phase pneumatic conveying to internally recycle overflow powder, and to thoroughly blend overflow, recovered and virgin powder to provide a consistent powder feed mix to a laser sintering machine. Overflow powder from the laser sintering machine is recovered and recycled back into the laser sintering machine for reuse. The approach results in a compact and reliable powder recycle system with complete blending and minimum attrition to the handled powder.

9 Claims, 13 Drawing Sheets

U.S. PATENT DOCUMENTS

| | | |
|---|---|---|
| 6,238,614 B1 | 5/2001 | Yang et al. |
| 6,336,480 B2 | 1/2002 | Gaylo et al. |
| 6,375,874 B1 | 4/2002 | Russell et al. |
| 2001/0045678 A1 | 11/2001 | Kubo et al. |
| 2002/0105114 A1 | 8/2002 | Kubo et al. |
| 2002/0152002 A1 | 10/2002 | Lindemann et al. |
| 2004/0021256 A1 | 2/2004 | DeGrange et al. |
| 2004/0025905 A1 | 2/2004 | Ederer et al. |
| 2005/0087906 A1 | 4/2005 | Caretta et al. |
| 2005/0278061 A1 | 12/2005 | DeGrange et al. |
| 2006/0219671 A1 | 10/2006 | Merot et al. |

FOREIGN PATENT DOCUMENTS

| | | |
|---|---|---|
| DE | 10158169 | 6/2003 |
| EP | 0167151 | 1/1986 |
| EP | 1316408 | 6/2003 |
| FR | 2166526 | 8/1973 |
| WO | WO 03/026876 | 4/2003 |
| WO | WO 2004/009224 | 1/2004 |
| WO | WO 2004/087331 | 10/2004 |

OTHER PUBLICATIONS

Dynamic Air Conveying Systems: "Principes Fondamentaux Du Transport Pneumatique" Nov. 20, 2004, pp. 1-6; retrieved Sep. 6, 2006 from www.dynamicair.com/pdf/9515-4-fr.pdf.

Jerry R. Johanson: "Batching: Understanding Mixers" Jul. 1, 2001; retrieved from Internet Jul. 1, 2001: www.ceramicindustry.com/CDA/Archives/a86a3ddb1e9c7010VgnVCM 100000f932a8c0.

German Patent Office Examination Report D106787 dated Oct. 27, 2006 for Application 102006010928.7-24; pp. 1-3 (English); 1-4 (German).

English Translation of Japanese Office Action, dated Feb. 2, 2010, of Japanese counterpart.

* cited by examiner

SELECTIVE LASER SINTERING POWDER RECYCLE SYSTEM

CROSS REFERENCE TO RELATED APPLICATIONS

This application is a continuation of U.S. patent application Ser. No. 11/077,304, filed Mar. 9, 2005, now abandoned, which is hereby incorporated herein in its entirety by reference.

BACKGROUND OF THE INVENTION

This invention is in the field of freeform fabrication, and is more specifically directed to the fabrication of three-dimensional objects by selective laser sintering.

The field of freeform fabrication of parts has, in recent years, made significant improvements in providing high strength, high density parts for use in the design and pilot production of many useful articles. Freeform fabrication generally refers to the manufacture of articles directly from computer-aided-design (CAD) databases in an automated fashion, rather than by conventional machining of prototype articles according to engineering drawings. As a result, the time required to produce prototype parts from engineering designs has been reduced from several weeks to a matter of a few hours.

By way of background, an example of a freeform fabrication technology is the selective laser sintering process practiced in systems available from 3D Systems, Inc., in which articles are produced from a laser-fusible powder in layerwise fashion. According to this process, a thin layer of powder is dispensed and then fused, melted, or sintered, by laser energy that is directed to those portions of the powder corresponding to a cross-section of the article. Conventional selective laser sintering systems, such as the Vanguard system available from 3D Systems, Inc., position the laser beam by way of an optics mirror system using galvanometer-driven mirrors that deflect the laser beam. The deflection of the laser beam is controlled, in combination with modulation of the laser itself, to direct laser energy to those locations of the fusible powder layer corresponding to the cross-section of the article to be formed in that layer. The computer based control system is programmed with information indicative of the desired boundaries of a plurality of cross sections of the part to be produced. The laser may be scanned across the powder in raster fashion, with modulation of the laser affected in combination therewith, or the laser may be directed in vector fashion. In some applications, cross-sections of articles are formed in a powder layer by fusing powder along the outline of the cross-section in vector fashion either before or after a raster scan that "fills" the area within the vector-drawn outline. In any case, after the selective fusing of powder in a given layer, an additional layer of powder is then dispensed, and the process repeated, with fused portions of later layers fusing to fused portions of previous layers (as appropriate for the article), until the article is complete.

Detailed description of the selective laser sintering technology may be found in U.S. Pat. No. 4,863,538, U.S. Pat. No. 5,132,143, and U.S. Pat. No. 4,944,817, all assigned to Board of Regents, The University of Texas System, and in U.S. Pat. No. 4,247,508, Housholder, all incorporated herein by reference.

Growing use of selective laser sintering technology, especially in limited run manufacturing and in the use of multiple machines in large service bureaus have created a need for more automated means for feeding, removing, and recycling of the powders used. Automating powder recycling can significantly reduce manual handling of powders, reduce exposures to the powders, and improve the consistency of the powders being fed to the sintering apparatus. Some automated systems have been described and used commercially. German utility model DE 201 07 262 U1 describes such a system that addresses some of these needs. These systems tend to take up a large amount of floor space and can be expensive because they have to handle large amounts of powder and use mechanical conveying systems such as spiral conveyors to move powder around. The use of mechanical spiral conveyors can lead to powder attrition issues with some powders. These systems also can have poor blending of different quality powders, leading to artifacts in the parts produced.

Thus there is a need to address the powder handling and recycle issues with more compact, reliable, and affordable systems that do not have the aforementioned problems of powder attrition and questionable blending. These problems are solved in the design of the present invention.

BRIEF SUMMARY OF THE INVENTION

It is an aspect of the present invention that overflow powder is recycled within a laser sintering machine for reuse.

It is an aspect of the present invention that a method and apparatus for a powder recycle system are provided that recycles powder material and blends in fresh powder within a laser sintering machine to achieve low powder attrition and excellent powder blending.

It is another aspect of the present invention that the powder recycle system operates in conjunction with the laser sintering apparatus to produce three-dimensional articles between which powder transfers are done by dense phase pneumatic conveying.

It is a feature of the present invention that the powder recycle system includes a pneumatic dense phase conveying device having at least a top receiving section for receiving powder to be transferred, a bottom transfer section angled toward an outlet, a porous plate in the bottom section, and an input of a conveying gas passing through the porous plate.

It is another feature of the present invention that the powder recycle system includes a breakout station with at least a worktable for separating recovered powder and spent powder from finished parts, a device for processing and separating recycle powder and spent powder, and a pneumatic dense phase conveying device for conveying recycle powder to the powder processing unit.

It is still another feature of the present invention that the powder recycle system includes a powder feed hopper with at least an inlet for receiving powder feeds adjacent a hopper chamber, a cylindrical rotatable roller positioned adjacent the hopper chamber, and a roller feeder positioned parallel and adjacent the roller to create a defined gap through which powder from the hopper chamber flows as the roller rotates.

It is yet another feature of the present invention that the powder recycle system includes a remote HTML browser application for accessing the system remotely to perform system functions, display the status of key system variables, and send warning e-mails.

It is a further feature of the present invention that the powder recycle system includes blending vessels that are used in a closed loop system prior to proportioning to pneumatically blend separately virgin or fresh powder and recovered powder and then mix the blended powders with overflow powder.

It is still a further feature of the present invention that one or more weigh bins in conjunction with weighing devices are used in the powder recycle system to achieve accurate proportioning and blending of fresh or virgin powder, recovered powder and overflow powder.

It is an advantage of the present invention that the powder recycle system achieves excellent blending of fresh or virgin powder with overflow and recovered powder to reduce powder loss and achieve consistent and uniform powder quality for use in a laser sintering system.

It is another advantage of the present invention that part artifacts from poor powder blending are reduced in parts produced in a laser sintering machine utilizing the powder recycle system.

It is still another advantage of the present invention that a low cost, automated powder handling system for a laser sintering machine is provided.

It is yet another advantage of the present invention that more uniform virgin powder and recovered powder are obtained.

It is a further advantage of the present invention that a compact, reliable powder handling system is provided that recycles for reuse overflow powder within a laser sintering machine.

It is still a further advantage of the present invention that powder stratification among virgin or fresh, recovered and overflow powder in blended powder within the powder recycle system is eliminated or minimized.

These and other aspects, features and advantages are achieved by the present invention by providing a laser sintering apparatus and method for producing three-dimensional articles from a powder utilizing a powder recycle system. The laser sintering apparatus includes at least a process chamber having a first side and an opposing second side in which an additive build process is performed, a powder feed hopper located on the first side of the chamber for delivering a quantity of powder into the chamber, a spreader located adjacent the feed hopper for spreading the quantity of powder in the chamber, a receiving device for receiving overflow powder delivered by the spreader located adjacent at least one side of the process chamber; and a conveying device within the laser sintering apparatus for returning the overflow powder to the powder feed hopper. The method for producing a bed of powder surrounding three dimensional articles includes at least the steps of: depositing a first portion of powder from a feed hopper across a target area from a first side to a second side, collecting the excess of the first portion of powder as overflow on the second side of target area; delivering a second portion of powder across the target area from the second side to the first side, collecting the excess of the second portion of powder as overflow on the first side of the target area, and pneumatically conveying the overflow from the first side and the second side of target area back to the feed hopper.

DESCRIPTION OF DRAWINGS

These and other aspects, features and advantages of the invention will become apparent upon consideration of the following detailed disclosure of the invention, especially when taken in conjunction with the following drawings wherein.

DETAILED DESCRIPTION OF THE INVENTION

Figure 1:
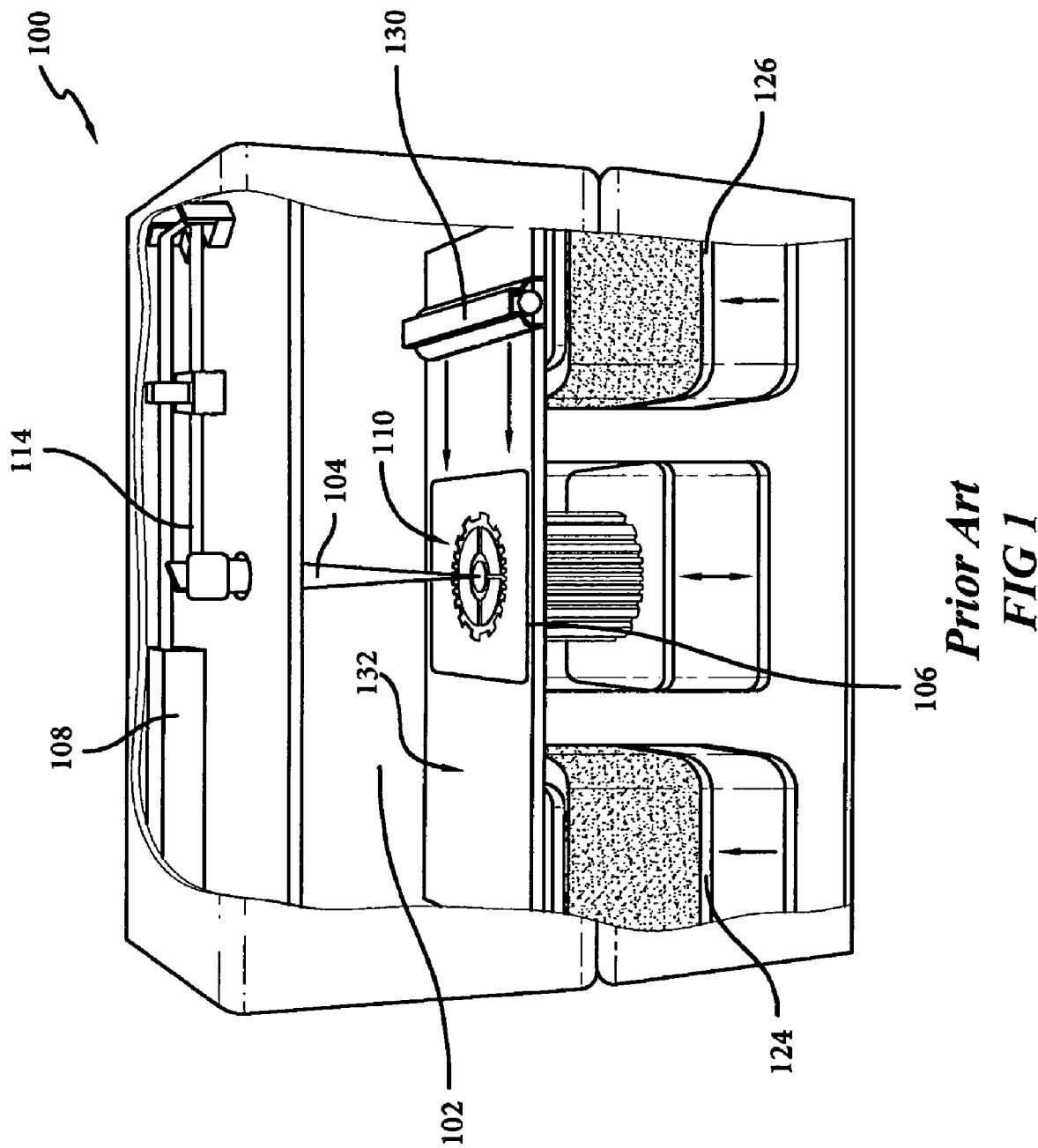
FIG. 1 is a diagrammatic view of a conventional prior art laser-sintering machine.

FIG. 1 illustrates, by way of background, a conventional laser sintering system, indicated generally as the numeral 100, currently sold by 3D Systems, Inc. of Valencia, Calif. FIG. 1 is a rendering shown without doors for clarity. A carbon dioxide laser 108 and its associated scanning system 114 is shown mounted in a unit above a process chamber 102 that includes a top layer of powder bed 132, two feed powder cartridges 124, 126, and a spreading roller 130. The process chamber 102 maintains the appropriate temperature and atmospheric composition (typically an inert atmosphere such as nitrogen) for the fabrication of the article.

Figure 2:
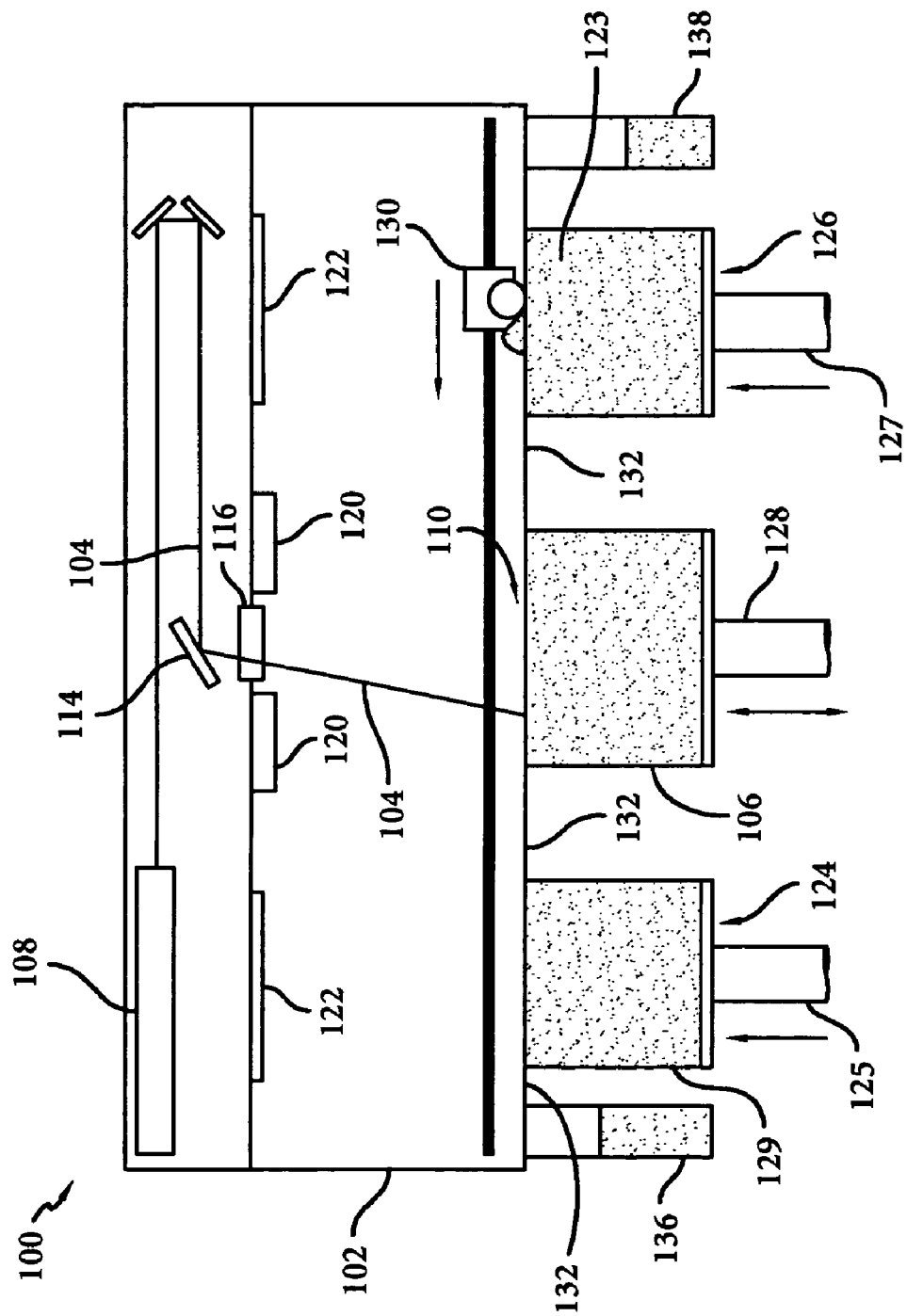
FIG. 2 is a diagrammatic front elevation view of a conventional prior art laser-sintering machine showing some of the mechanisms involved.

Operation of this conventional laser sintering system 100 is shown in FIG. 2 in a front view with the doors removed for clarity. A laser beam 104 is generated by laser 108, and aimed at target area 110 by way of optics-mirror scanning system 114, generally including galvanometer-driven mirrors that deflect the laser beam. The laser and galvanometer systems are isolated from the hot process chamber 102 by a laser window 116. The laser window 116 is situated within radiant heater elements 120 that heat the target area 110 of the part bed 132 below. These heater elements 120 may be ring shaped (rectangular or circular) panels or radiant heater rods that surround the laser window. The deflection of the laser beam 104 is controlled in combination with modulation of laser 108 itself, to direct laser energy to those locations of the fusible powder layer corresponding to the cross-section of the article to be formed in that layer. Scanning system 114 may scan the laser beam 104 across the powder in a raster-scan fashion, or in vector fashion.

Two feed systems (124, 126) feed powder into the system 100 by means of a push up piston system. Target area 110 receives powder from the two feed pistons as follows: Feed system 126 first pushes up a measured amount of powder and a counter-rotating roller 130 picks up and spreads the powder over the part bed 132 in a uniform manner. The counter-rotating roller 130 passes completely over the target area 110 and feed bed 124 and then dumps any residual powder into an overflow container 136. Positioned nearer the top of the chamber 102 are radiant heater elements 122 that pre-heat the feed powder and a ring or rectangular shaped radiant heater element 120 for heating the part bed surface. Element 120 has a central opening which allows laser beam 104 to pass through the laser window 116. After a traverse of the counter-rotating roller 130 across the system 100 the laser 108 selectively fuses the layer just dispensed. Then the roller 130 returns from the area of the overflow chute 136, the feed piston 124 pushes up a prescribed amount of powder, and the roller 130 dispenses powder over the target area 110 in the opposite direction and proceeds to the other overflow chute 138 to drop residual powder. Before the roller 130 begins each traverse of the system 100, the center part bed piston 128 lowers the part cake by the desired layer thickness to make room for additional powder.

The powder delivery system in system 100 includes feed pistons 125 and 127, controlled by motors (not shown) that move upwardly and lift (when indexed) a desired volume of the powder 123 and 129 from the powder feed chambers 124 and 126 into chamber 102. Part piston 128 is controlled by a motor (not shown) to move downwardly below the floor of chamber 102 by a small amount, for example 0.125 mm, to define the thickness of each layer of powder to be processed. Roller 130 is a counter-rotating roller that translates powder 123 from feed chamber 126 by feed piston 127 onto target area 110. When traveling in either direction the roller 130 carries any residual powder not deposited on the target area into overflow cartridges 136 and 138 on either end of the process chamber 102. Target area 110, for purposes of the description herein, refers to the top surface of heat-fusible powder in the part cake 106 (including portions previously sintered, if present) disposed above part piston 128. System 100 of FIG. 2 also requires radiant heaters 122 over the feed pistons 125 and 127 to pre-heat the powder to minimize any thermal shock as fresh powder is spread over the recently sintered and hot target area 110. This type of dual push up piston feed system with heating elements for both feed and part beds is implemented commercially in the Vanguard selective laser sintering system sold by 3D Systems, Inc. of Valencia, Calif.

Figure 3:
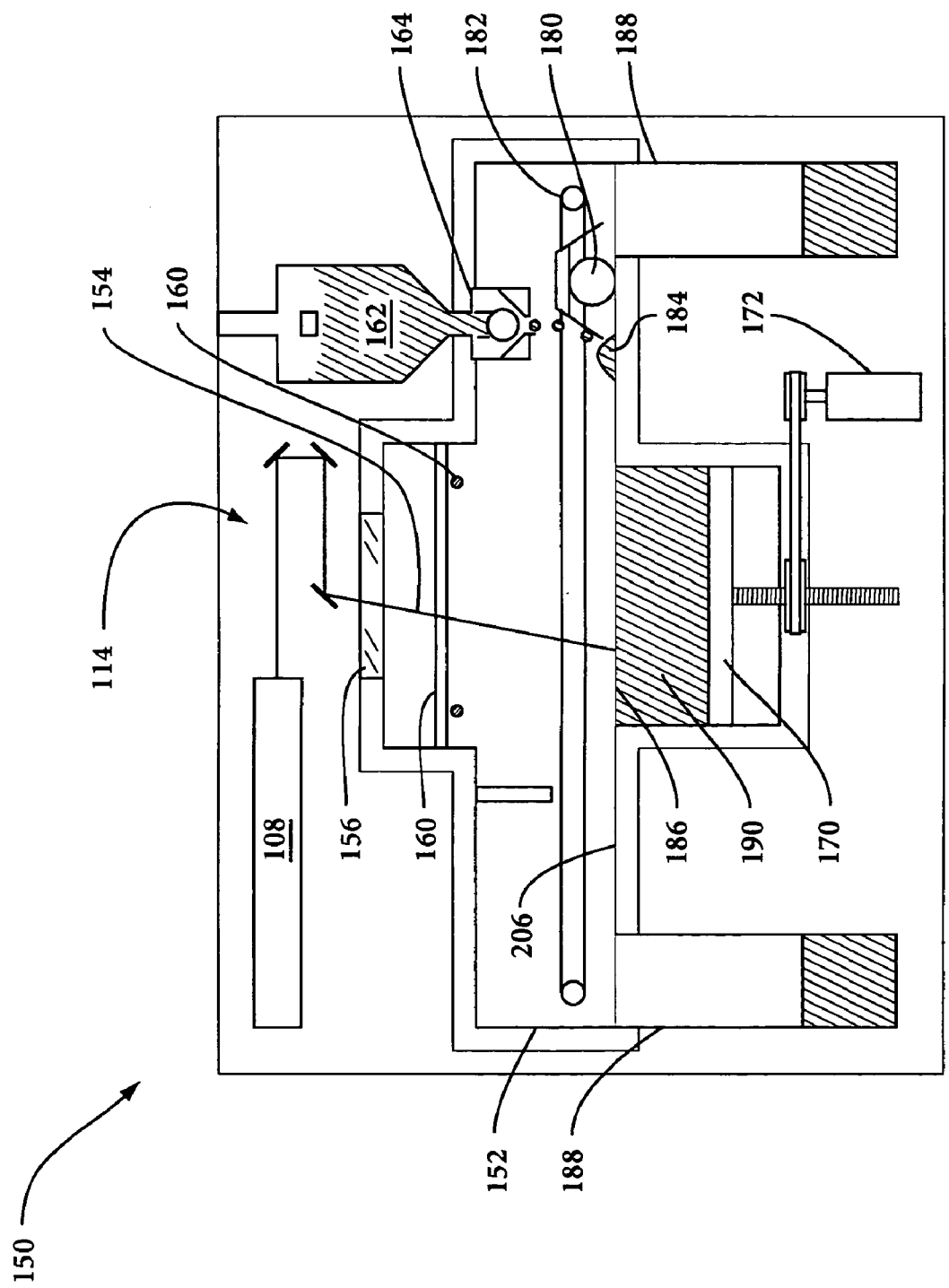
FIG. 3 is a diagrammatic front elevation view of a laser sintering machine with a top feed mechanism.

An alternative powder delivery system for a laser sintering system is shown in FIG. 3. The overall system is represented generally by the numeral 150. In this system the powder feed mechanism is no longer a push up piston system as shown in FIGS. 1 and 2. Instead a feed hopper 162 and 164 is used to periodically deposit powder 184 onto process chamber floor 206 where it is spread by counter-rotating roller 180 that is moved in reciprocating fashion by drive system 182. The method for depositing and spreading powder in both directions in this approach is described completely in U.S. patent application Ser. No. 10/856,303, assigned to the assignee of the present invention and hereby specifically incorporated by reference into this application.

Operation of the selective laser sintering system of FIG. 3 is similar in other ways to that of the system shown in FIG. 2. A laser beam 154 is generated by laser 108, and aimed at target area 186 by way of optics-mirror scanning system 114, generally including galvanometer-driven mirrors that deflect the laser beam. The laser and galvanometer systems are isolated from the hot process chamber 152 by a laser window 156. The laser window 116 is situated within radiant heater elements 160 that heat the target area 186 of the part bed below. These heater elements 160 may be ring shaped (rectangular or circular) panels or radiant heater rods that surround the laser window 156. The deflection of the laser beam 154 is controlled in combination with modulation of laser 108 itself, to direct laser energy to those locations of the fusible powder layer in the target area 186 on the exposed surface of the part cake 190 corresponding to the cross-section of the article to be formed in that layer. Scanning system 114 may scan the laser beam 154 across the powder in a raster-scan fashion, or in vector fashion. Once the cross-section is formed the part cake 190 is lowered one layer thickness by the drive system 172 lowering support platform 170 on which is the part cake 190.

There are three basic categories of powder used in a selective laser sintering system. Virgin powder refers to fresh powder fed to a system. Overflow powder is the excess powder pushed out of the build chamber, such as the powder in containers 136 and 138 in FIG. 2 or the powder in containers 188 in FIG. 3. Recovered powder is powder recovered outside of the build or process chamber when the manufactured parts in the part cake are removed from the system. Such recovered powder is collected and recovered outside of the laser sintering machine in a device usually referred to as a breakout station.

Figure 4:
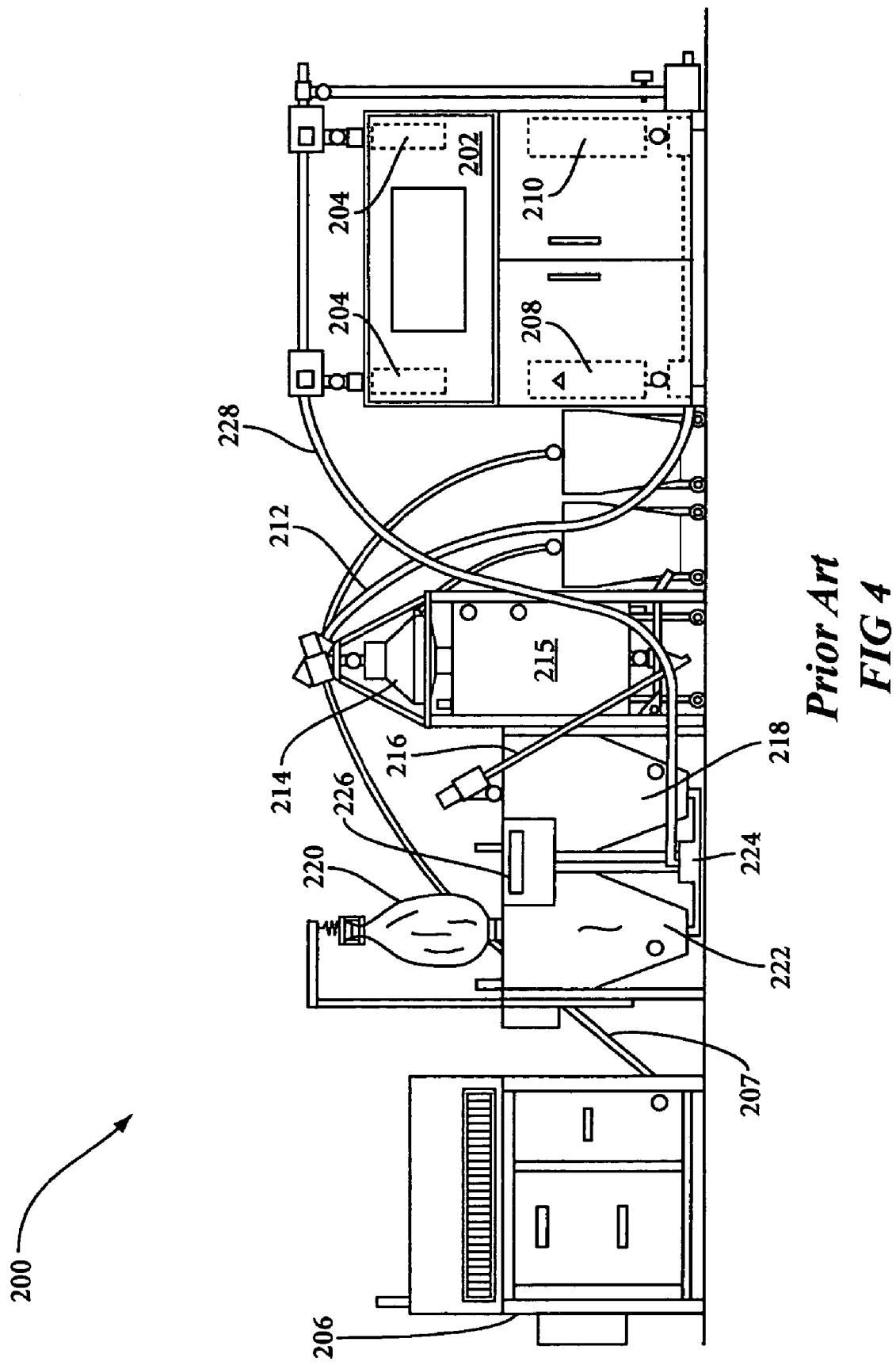
FIG. 4 is a schematic view of a prior art powder recycle system.

The utilization of these three categories of powder is shown in an automated manner in a prior art powder recycle system shown in FIG. 4, represented generally by the numeral 200. This prior art system is described in German utility model DE 201 07 262 U1. A laser-sintering machine 202 has feed powder fed into two feed hoppers 204. Completed builds from machine 202 are moved manually to breakout station 206 where the parts are removed from the non-sintered recoverable powder. Two overflow containers 208, 210 in machine 202 collect overflow powder and transfer via line 212 it into a sieve system 214. The same sieve system 214 is also fed recovered powder from breakout station 206 via line 207. Sieved powder from sieve system 214 is stored in vessel 215 and later transferred via line 216 to blend tank 218. Virgin powder from bag 220 is fed to virgin blend tank 222. The outputs from the two blend tanks 218 and 222 is blended in blender device 224 controlled by controller 226 and then transferred via line 228 back to sintering machine 202. All of the transfer lines 207, 212, 216, and 228 have internal mechanical spiral conveyors for transferring powders.

The prior art powder recycle system described is operational, but has a very large physical footprint and is expensive due to the mechanical spiral conveyer systems. One of the reasons for the size is the need to handle all three categories of powder (virgin, overflow, and recovered) outside of the laser sintering machine. In addition although spiral conveyors are fairly efficient at mixing powders locally they can result in powder attrition from the mechanical action. Another aspect of the prior art scheme of FIG. 4 is that it cannot ensure a consistent proportion of the three categories of different powders. There is no surge volume for the overflow and recovered powders and, since these powders must be removed on demand to avoid stopping other processes, the proportion of these two powders into vessel 215 is uncontrolled. Therefore the proportion of these two powders into vessel 215 is of an unknown mixture. Because the overflow and recovered powders differ in properties, the properties of the used powder in this system fed from vessel 218 will also vary, resulting in part artifacts. Another inherent disadvantage of the prior art design is that the blending of powders from vessels 222 and 218 is done by a volumetric ratio controlled by controller 226. It is common with different fine powders, such as the virgin, recovered, and overflow powders utilized in the present invention, that any two or all of such fine powders vary in bulk density. When such powders in this prior art system are presented to the volumetric proportioning device, the proportions of each powder cannot be accurately predicted and controlled.

These issues are addressed by the instant invention. All transfers of powder are performed by dense phase pneumatic transfer which allows more tight and compact piping and the overflow powder is kept within the laser sintering machines, where it is transferred directly back to the machine feed hopper via dense phase transfer. By eliminating the overflow powder from the exterior recycle system the overall size and complexity is significantly reduced. A closed loop pneumatic transfer of powder through blending vessels achieves complete blending to eliminate stratification. The use of dense phase pneumatic conveying systems instead of mechanical spiral conveying systems reduces the potential of powder attrition. All proportioning of the different powders is done by weight, rather than through volume ratio control, ensuring accurate proportioning even when bulk densities vary.

Certain solids can be suspended and transported in gas (normally air). This is referred to as pneumatic conveying. Pneumatic conveying systems are suitable for transporting material in powdered form or as granular solids. The powder/solids has to be dry, with not more than 20% moisture, and non-sticking. There are two basic regimes in pneumatic transport systems:

dilute phase conveying at a high gas speed (20-30 m/s); and
dense phase conveying at a low gas speed (5-10 m/s)

In a pneumatic conveying system most of the energy is used for the transport of the air itself. The energy efficiency of a pneumatic conveying plant is therefore relatively low, but the handling is easy and, in well-designed systems, often free of dust. Dense phase conveying systems are more efficient because much less air is used to convey the same quantity of solids. The inherent lower air velocities also result in gentle solids handling.

Pneumatic systems can operate with both positive and negative pressures (vacuum). All of the powder transport in the instant invention systems to be described is based on dense phase transfer of the powder. The powder recycle system of the present invention employs a novel dense phase transporter design. The gas employed in the pneumatic system of the present invention can be air, nitrogen, another inert gas such as argon, carbon dioxide or any combinations thereof. Air is the preferred gas.

Figure 5:
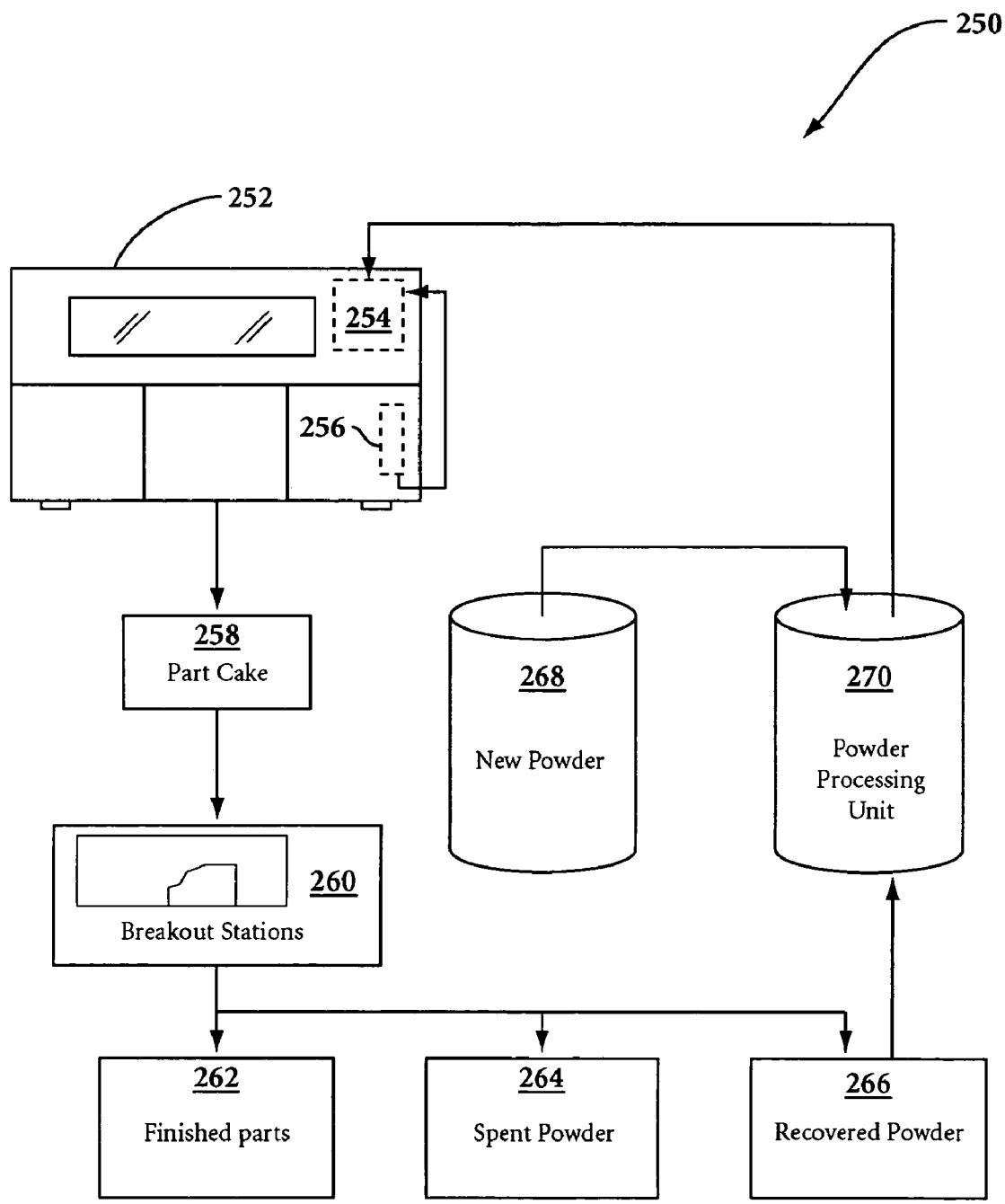
FIG. 5 is a schematic overview of the powder recycle system of the instant invention.

FIG. 5 is an integrated overview of the instant invention's powder recycle system, represented generally by the numeral 250. One or more laser sintering machines 252, similar to that described in FIG. 3, are equipped with a feed hopper 254 and one or more overflow containers 256. Not shown in FIG. 5, but described in more detail later, is a dense phase transporter located within laser sintering machine 252 which transfers overflow powder from container 256 back to feed hopper 254. This aspect eliminates a significant powder-handling load from the external powder processing modules to be discussed. At the completion of builds in machine 252, a part cake 258 which consists of the fabricated parts and the unfused powder around those parts, is moved to break-out stations 260. Here the separation of part cake 258 into finished parts 262, lower quality or spent powder 264, and recovered powder 266 for recycle is accomplished mechanically. Spent powder is normally composed of larger hard agglomerates created by powder close to the hot parts. Spent powder is not suitable for recycle and is discarded. A dense phase transporter, see briefly FIGS. 6, 9 and 10, then transports recovered powder 266 to powder processing unit 270 where it is combined with new powder 268 to be fed back to the machine feed hopper 254. In one embodiment, blending of the overflow powder with the combined powder from processing unit 270 can occur at the feed hopper 254 using In-bin blending technology to be described hereinafter. Not shown in this and the following figures is the network of air piping and controls that drive the dense phase pneumatic transfers throughout the system.

Figure 6:
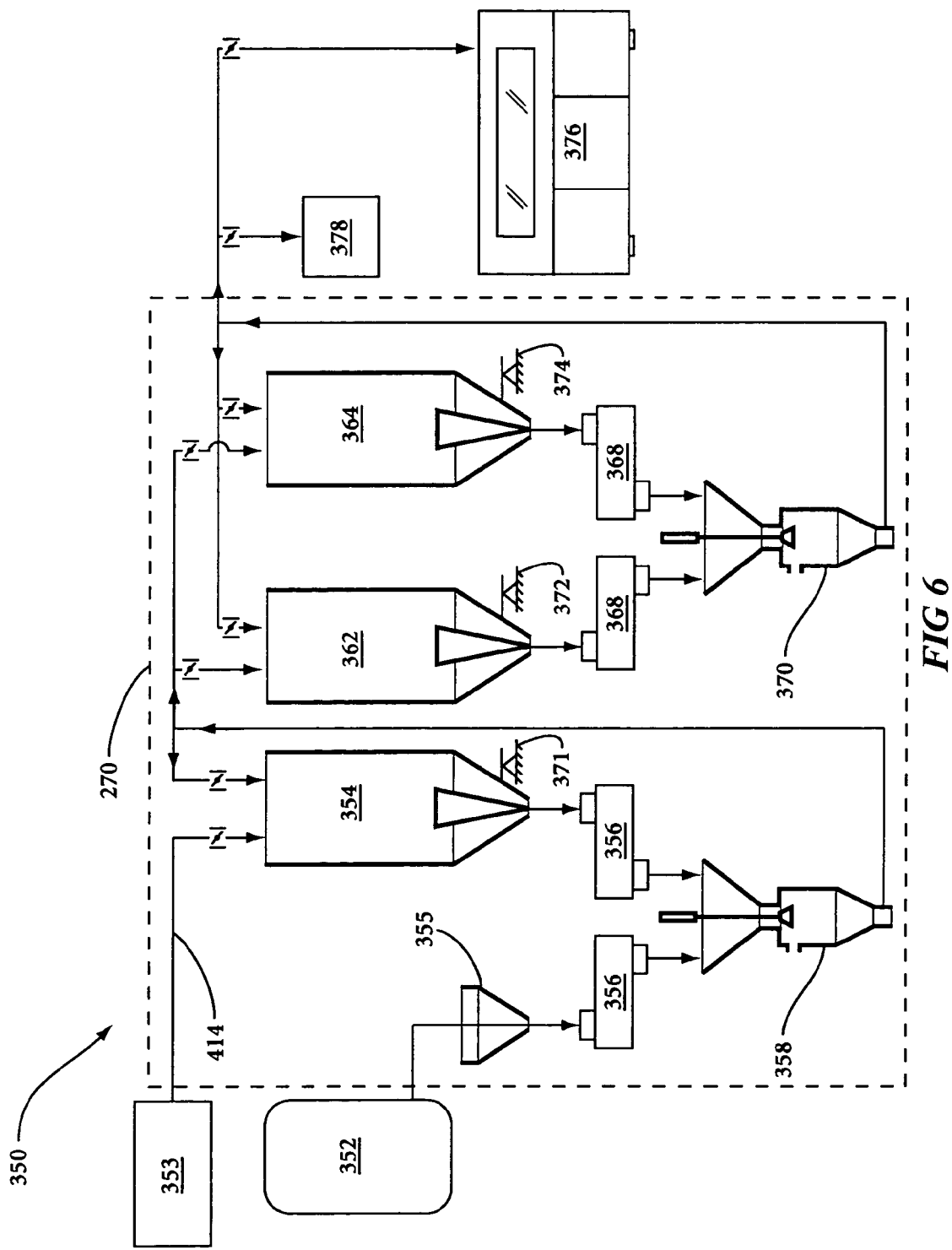
FIG. 6 is a schematic view of the powder processing unit and the powder recycle system within the overall powder handling system.

FIG. 6 shows the powder-processing unit as part of the overall powder recycle system, represented generally by the numeral 350. Recovered powder from a separate breakout station 353 (to be described later) is conveyed in a batch-wise manner to recovered storage vessel 354. Virgin powder from supply 352 is conveyed into a surge hopper 355. Virgin powder and recovered powder from recovered powder storage vessel 354 can both feed through L-valves 356 into a dense phase transporter 358. Dense phase transporter 358 uses pneumatic dense phase conveying to convey the resultant powder to either a blender vessel 362, a virgin powder storage vessel 364, or in a circulating pattern back to recovered powder storage vessel 354. When the system operator desires to transfer a new batch of virgin powder into virgin powder storage vessel 364, the valves are set appropriately and virgin powder is conveyed through dense phase transporter 358 to virgin powder storage vessel 364. Alternatively, virgin powder can be fed directly into virgin powder storage vessel 364. Virgin powder can be blended by setting the valves appropriately and recirculating the virgin powder from virgin powder storage vessel 364 through L-valve 368 and dense phase transporter 370 back to vessel 364. Similarly, when the system operator desires to thoroughly blend various batches of recovered powder, the valves are set appropriately so that recovered powder from recovered powder storage vessel 354 is circulated repeatedly through recovered powder storage vessel 354, L-valve 356 and dense phase transporter 358. Blending of the powder occurs during this recirculation.

A number of mixing technologies can be used within the vessels. A preferred approach is to use In-bin types of blending rather than some type of mechanical blending such as mechanical stirrers. In-Bin blenders utilize the natural velocity profile that exists in flowing solids to affect the order of discharge for solid particles introduced at the same time. In other words, particles introduced at the same time exit the vessel over a period of time. Because they exit the vessel over a time period, other particles introduced at other times will be mixed with them as they are also spread over time. For example, in a gravity flow blender, a horizontal layer of solids introduced into the top of the vessel will blend with other horizontal layers introduced previously if the velocities of different parts of the layer are faster or slower. A mass-flow vessel naturally has a faster flow velocity at the vessel centerline than near the vessel walls. This causes the center particles from a layer introduced at one time to exit the vessel at the same time as the particles from a layer introduced much earlier, thus blending the two layers as they flow through the vessel.

Blending can be done in two ways. Single-pass, continuous blending can smooth batch-to-batch variations by blending batches deposited one on top of the other. However, single-pass blending does not effectively blend the first batch that enters the vessel because it cannot combine with other batches. More complete blending can be done by conveying solids from the vessel outlet back to the top of the vessel and allowing them to flow through again. It is also possible to recirculate just the first few batches entering the vessel and then use single-pass blending to continue blending without recirculation as long as a minimum amount of powder is kept in the vessel. Blending with recirculation can be used to achieve primary blending of different ingredients. If large amounts of a particular ingredient are deposited into the vessel, it will take more recirculation to achieve an effective blend. Material deposited in layers of different ingredients will be able to achieve an effective blend with less recirculation.

A preferred type of In-bin blending technology is a cone-in-cone insert inside the vessel. A cone-in-cone insert inside the vessel propagates the velocity profile up above the hopper section and allows the velocity profile to be adjusted to optimize blending. It also allows mass-flow or solids flow at the walls to occur in a hopper with a flatter slope than would normally permit mass flow. In order for in-bin blending to occur, there must be no non-flowing regions within the vessel. In other words, when material flows from the outlet, all the material inside the vessel must move because non-flowing regions will not blend. A cone-in-cone design can eliminate segregation of powders and improve flow of granular or powdered solids by controlling the velocity profile throughout a vessel. A steep interior cone propagates flow to a flatter outer cone. This tends to eliminate some powder flow obstructions, such as what are known in the powder handling industry as "rat holes", and prevents segregation even in relatively flat vessels. This anti-segregation flow pattern remixes solids that often segregate when they drop into an ordinary vessel. The system is highly versatile in being able to mix repeatedly or to flow straight thorough depending on the application. As shown in FIG. 6 vessels 354, 362, and 364 each can have interior cone-in-cone blending systems. Cone-in-cone blenders are known art. Each vessel 354, 362, and 364 has a weighing device 371, 372, and 374 respectively, which ensures accurate transfers by weight of each powder. Weighing devices 371, 372, and 374 can employ load cells to accurately weigh the powders contained in vessels 354, 362 and 364 and transmit those weights to a controller within the powder recycle system 350.

When the operator desires to prepare a final blend of recovered and virgin powder from storage vessels 354 and 364, respectively, the valves are set appropriately so that recovered powder from recovered storage vessel 354 flows through L-valve 356 into dense phase transporter 358 into blender vessel 362. Virgin powder is then fed through the appropriate L-valve 368 into dense phase transporter 370 and the resultant mix is circulated around and through blender vessel 362. As described previously, this action results in a well-blended powder with no segregation as the powder passes through the cone-in-cone blender design. When appropriately blended the final powder blend can then be transported to sintering machine 376. Also shown is an auxiliary storage device 378 for instances in which it is desired to store or move powder outside the system.

The design of the instant invention allows a great deal of flexibility by appropriate valve action to blend powder to the desired mix before feeding on to laser sintering machine 376. All of the various flow possibilities, including the valve actions, can of course be under computer control, so that operation is automatic rather than manual.

While operating in an automatic mode the system of the instant invention performs the following functions. While powder is being supplied to the sintering machine or during idle time, the machine will automatically keep virgin powder storage vessel 364 full by pneumatically conveying powder from the supply container 352. Optionally the user can blend the virgin powder in vessel 364 with itself and with powder stored previously to negate shipping container segregation and batch-to-batch variations. The system will also automatically convey recovered powder from breakout station 353 to recovered powder storage vessel 354 as the operator breaks parts out. Optionally the system operator can blend recovered powder with itself and with powder stored previously to negate segregation during breakout, variations within the part cake and variations between part cakes due to differences in subsequent builds.

As the blender vessel 362 of FIG. 6 begins to near empty, the powder handling system 350 will automatically convey powder from the virgin powder storage vessel to meet a weight set point. This may be done in alternating layers with the recovered powder from the recovered powder storage vessel 354 by conveying powder from the recovered powder storage vessel to meet a weight set point. This filling would be done in alternate layers of virgin and recovered powders to speed blending. As the blender vessel 362 fills, the powder processing unit 270 of the powder recycle system re-circulates powder from the blender vessel outlet to the blender vessel inlet and uses the cone-in-cone blending design to blend the virgin and recovered used powder together. The system then automatically supplies the laser sintering machine 376, or multiple machines, with powder when the one or more machine's level sensors call for powder. During blending a number of known methods can be used to measure powder quality during blending. One well known analytical technique to monitor quality is to measure the melt flow index of the blended powder.

Figure 7:
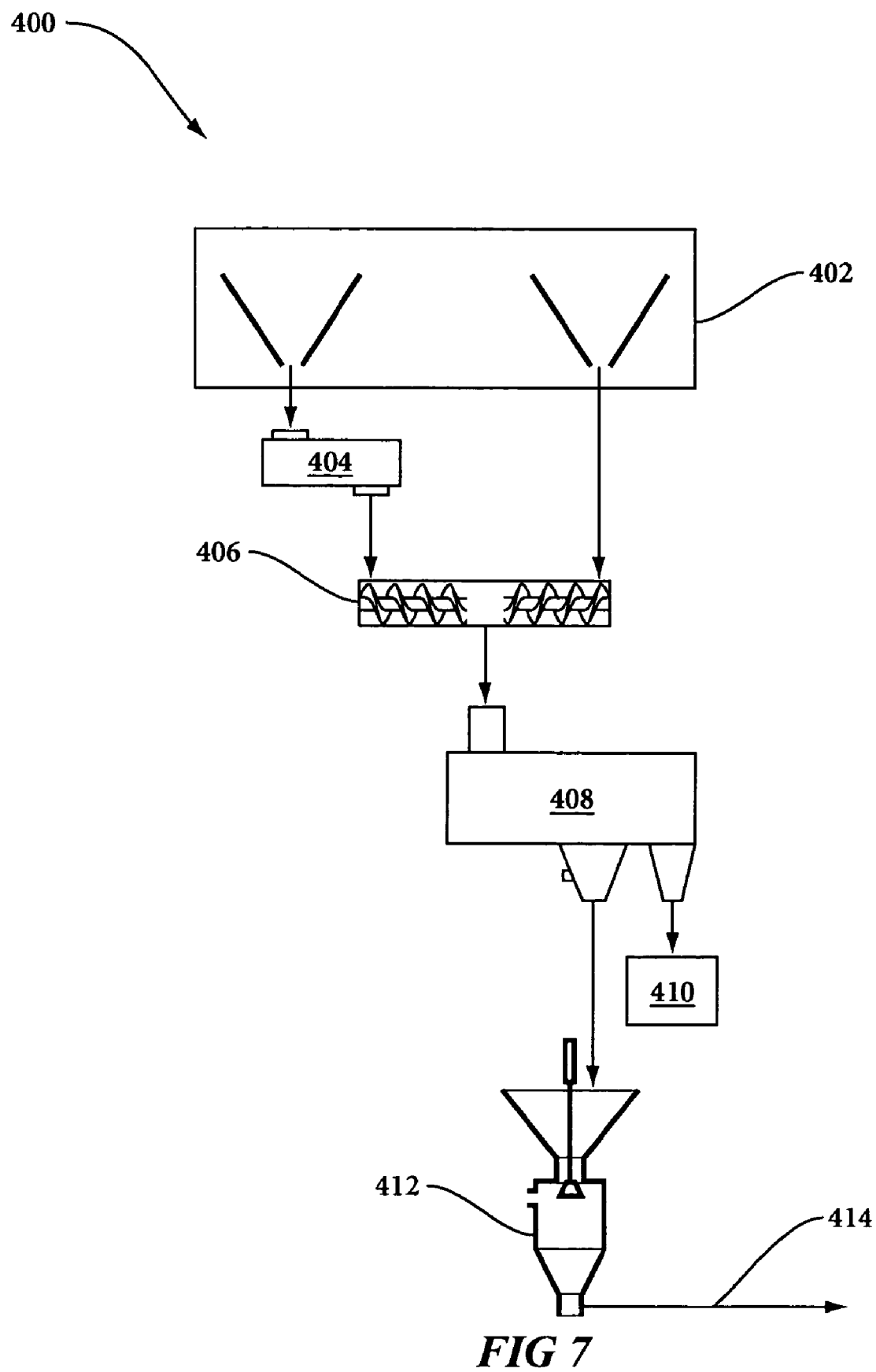
FIG. 7 is a schematic view of a breakout station.

FIG. 7 is a schematic representation of the breakout station, represented generally by the numeral 400. A part cake is placed on table 402 of the breakout station that has two opposing sides (left and right) for accepting removed recoverable powder and spent powder from the part cake. These are fed either directly or through an air slide 404 to screw feeder 406 which feeds device 408 which makes the separation between the recoverable powder and the larger agglomerates of the unusable spent powder, which is placed into trash receptacle 410. A preferred device 408 is a rotary sifter. The thus recovered powder drops into dense phase transporter 412 that transfers the powder via powder ducting 414 back to the recovered powder storage vessel 354 in FIG. 6.

Figure 9:
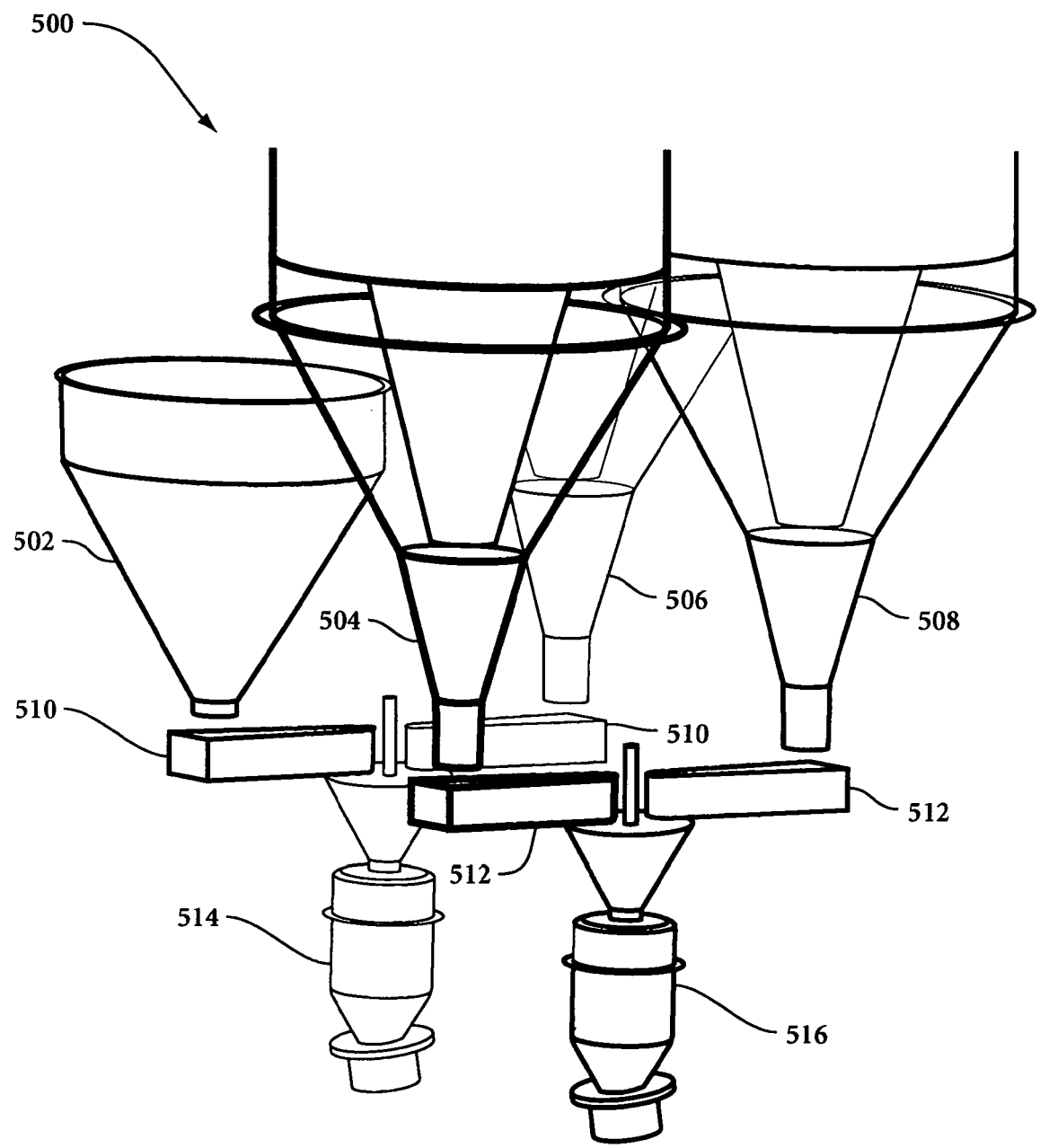
FIG. 9 is a rendering of the bottom section of the powder-processing unit.

The compact size and reliability of the instant invention powder recycle system is enabled by the use of pneumatic dense phase conveying of powder all through the system. FIG. 9 is a rendering of the two dense phase transporters, seen as 358 and 370 in FIG. 6. In FIG. 9 the transporters 514 and 516 are configured under the vessels of the powder-processing unit 270 shown in FIG. 6. Recovered powder storage vessel 506 and surge hopper 502 feed into L-valves 510 that in turn feed into dense phase transporter 514. The details of the operation of the L-valves and dense phase transporters will be described hereinafter. The other two main vessels of the powder processing unit, the virgin powder storage vessel 508 and the blender 504, feed together through L-valves 512 into dense phase transporter 516.

Figure 10:
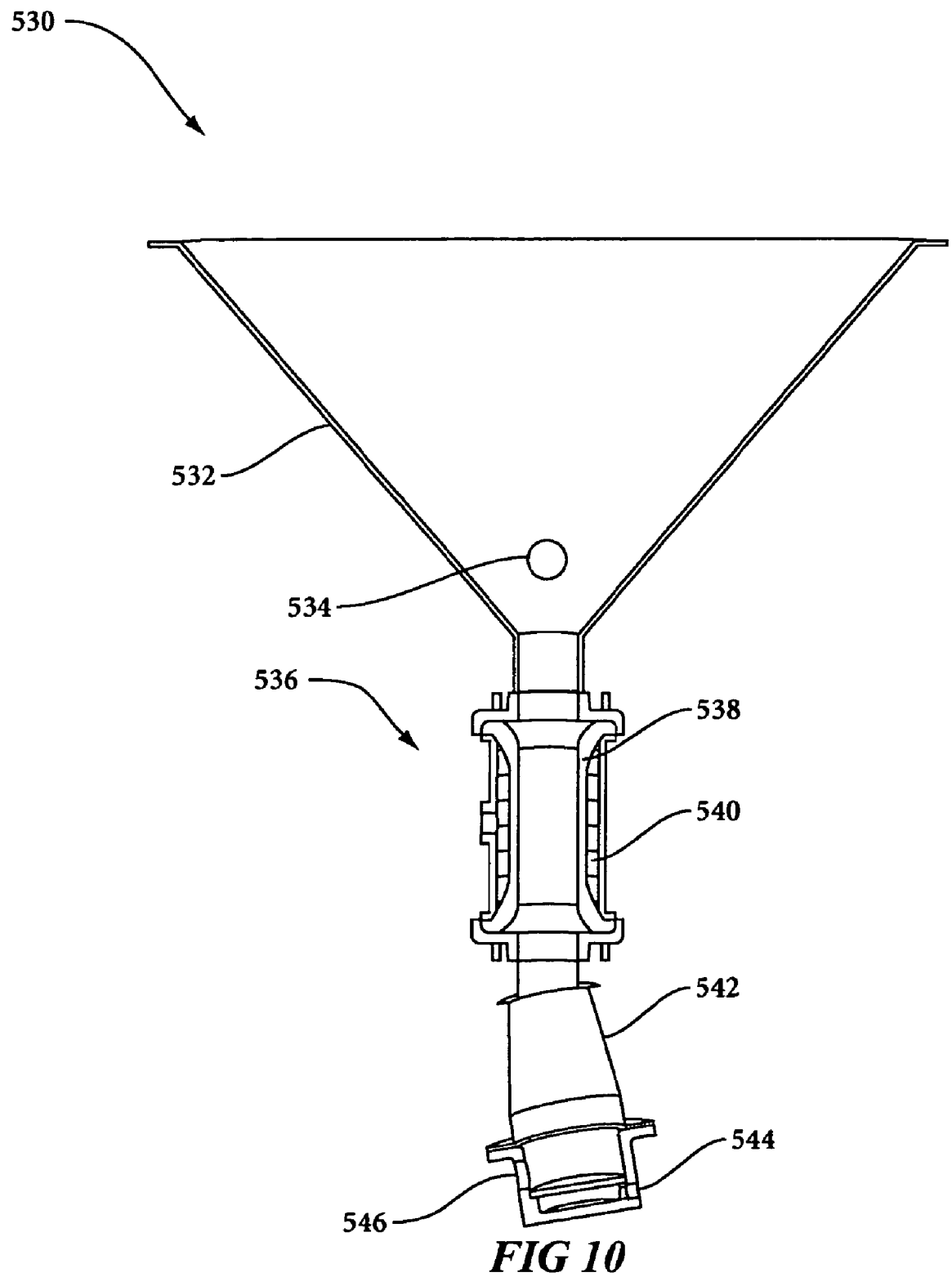
FIG. 10 is a cross sectional view of the overflow container and dense phase recycle transporter to recover and transport for reuse overflow powder material from within the laser sintering machine.

FIG. 10 is a view of the internal overflow or excess powder receiver and conveyor system represented generally by the numeral 530. Overflow receiver 532 collects overflow powder from each side of the part bed during a build. The overflow powder flows through an appropriate valve 536, such as an air actuated pinch valve with an expandable bladder 538 actuated by air pumped into reservoir 540, controlling flow down to a small dense phase transporter 542 below. Dense phase transporter 542 conveys powder back up to the powder feed hopper (not shown), thereby leaving all overflow powder inside the sintering machine. Powder is fluidized in dense phase transporter 542 by air fed through inlet 544. Powder passes out through outlet 546 in a manner to be described. Level sensor 534 feeds a control scheme that opens the pinch valve 536 when the powder in receiver 532 reaches the level of sensor 534. This ensures a constant powder seal that prevents blowing conveying air into the sintering machine.

Figure 11:
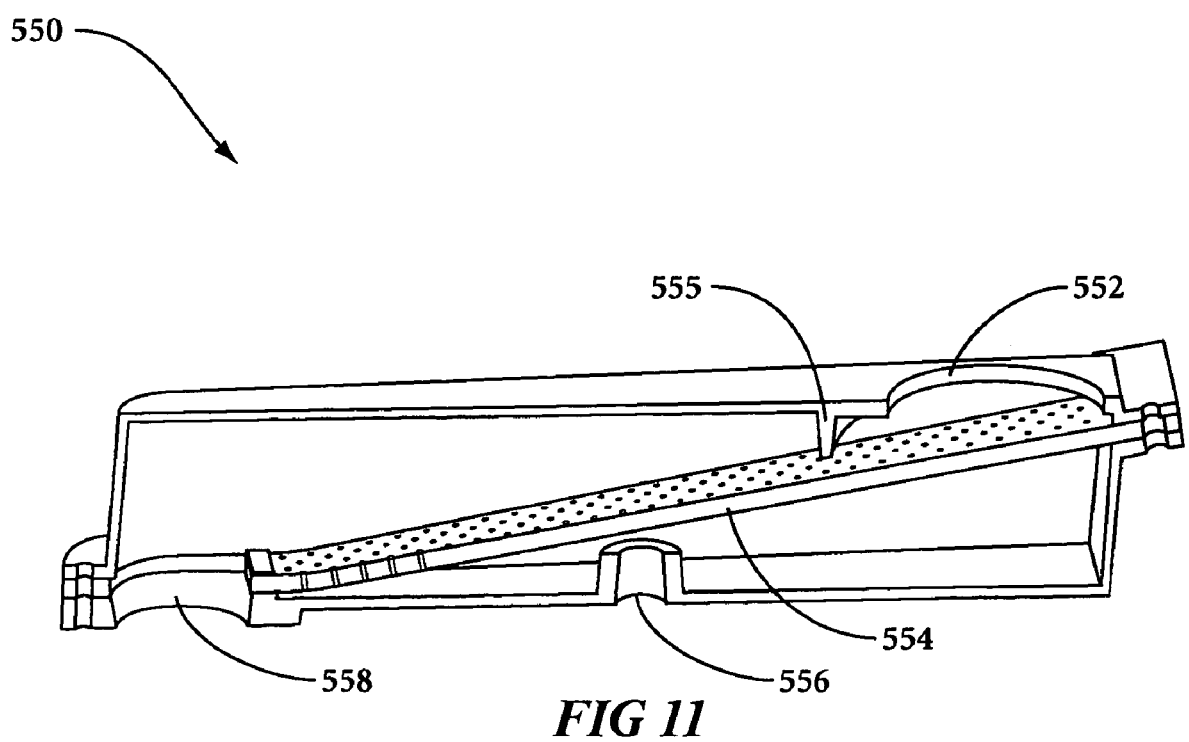
FIG. 11 is a cross sectional view of an L-valve.

One of the L-valves of FIG. 9, represented generally by the numeral 550, is shown in more detail in the cross sectional view seen in FIG. 11. Powder from any vessel drops by gravity through inlet 552 onto porous plate 554. Inlet 556 is a source of air for the L-valve. As air passes through inlet 556 and passes through porous plate 554 the powder on the plate is fluidized and moves downwardly along plate 554 and out exit 558 along with the fluidizing air. When air to inlet 556 is turned off, the fluidized powder on plate 554 collapses and quickly forms a seal at feature 555. Thus, an L-valve is an efficient valve for control of powder flow with a straightforward flow of air into inlet 556. L-valves are known prior art in the powder handling industry.

Figure 12:
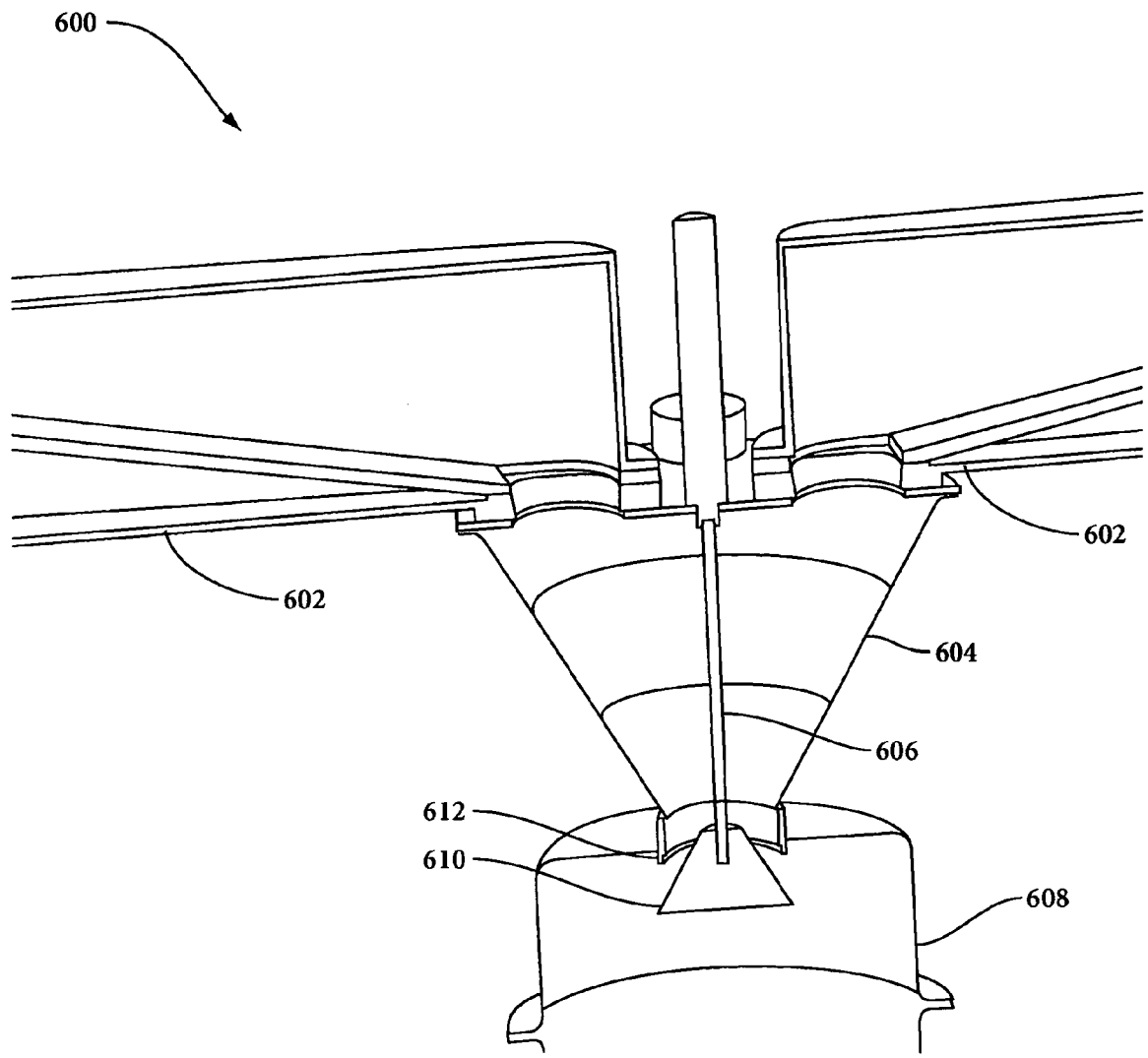
FIG. 12 is a cross sectional view of the top feeder of a transporter system.

FIG. 12 is a cross sectional view of the entrance to the dense phase transporter, indicated generally by the numeral 600, showing the two L-valves 602 connected to the feeder section 604 of a dense phase transporter. Feeder section 604 includes plug valve 610 which can be moved up by valve stem 606 to form a seal against valve seat 612 with top section 608 of the dense phase transporter 600 so that the dense phase transporter can be pressurized to transport the intended powder.

Figure 13:
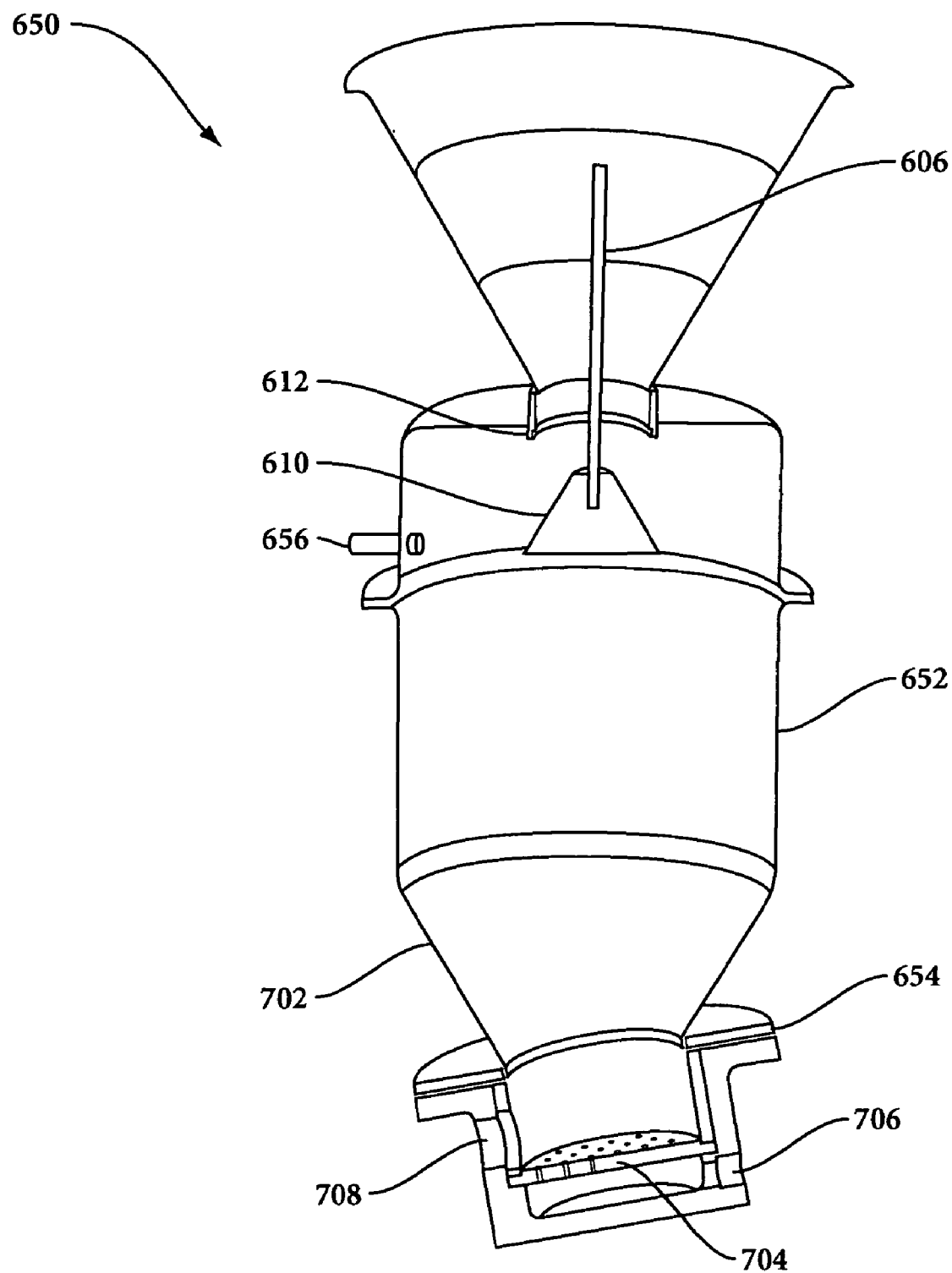
FIG. 13 is a cross section view of a dense phase transporter.

The complete dense phase transporter device, now indicated generally by the numeral 650, is shown in a cross sectional view in FIG. 13. The dense phase transporter 650 consists of a top receiving section 652 and frusto-conical section 702 connected to a bottom transfer section 654. Bottom transfer section 654 importantly is configured at an angle from the vertical to ensure good powder conveyance. This tilt of the bottom transfer section 654 ensures that porous plate 704 is not horizontal, but is tilted at an angle. Plate 704 is porous so that with an airflow it acts to fluidize powder falling on it. Pressurized air enters at inlet 706 and flows up through porous plate 704 to provide the fluidizing action. Fluidized powder flows downwardly along outlet plate 704 toward and out of outlet 708. The angled design, or an alternative center discharge outlet design employing the porous plate in a downwardly angled conical fashion, ensures a steadier dense phase transport with less potential for plugging. When airflow into inlet 706 is reduced below the fluidization point, the powder on plate 704 collapses and forms a bridge at exit 708 that stops flow. The offset angle should be greater than about 9-10 degrees from the horizontal, but can be much larger. A preferred angle is about 10 degrees.

Returning briefly to the description of FIG. 5, the flow of powder material in powder recycle system 250 is completed by returning powder from powder processing unit 270 and feeding it to powder feed hopper 254 in laser sintering machine 252, where it is combined with internal overflow powder from container 256.

Figure 8:
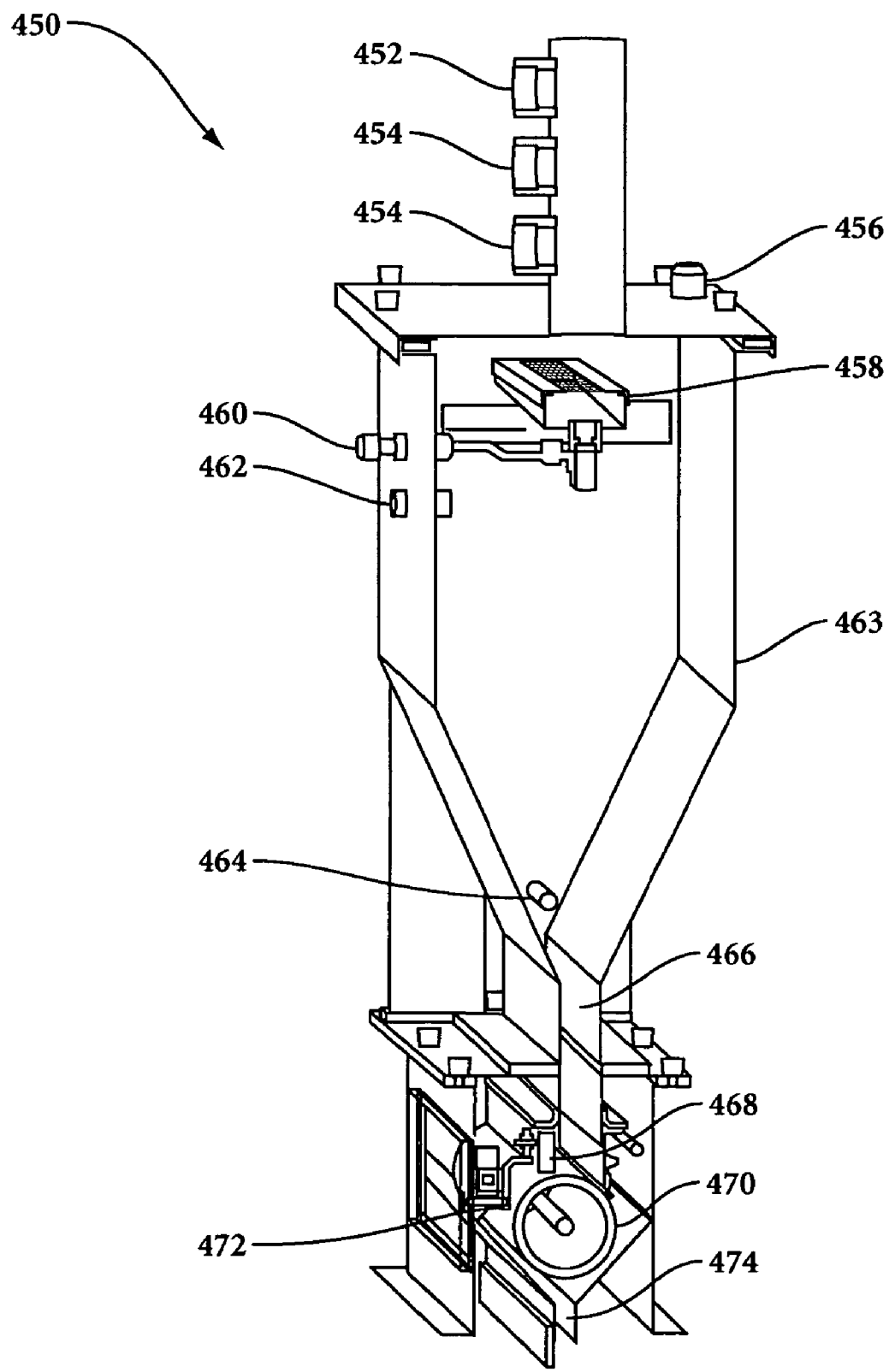
FIG. 8 is a cross sectional view of a powder feed hopper.

Turning now to FIG. 8, the powder feed hopper in the laser sintering machine is shown represented generally by the numeral 450. Three powder inlets are shown in the top of powder feed hopper 450. Inlet 452 accepts powder fed from the dense phase transporter 370 of FIG. 6. Inlets 454 accept overflow powder originating within the sintering machine from dense phase transporter 542, described in FIG. 10. Combined powder from inlets 452 and 454 falls by gravity onto air slide 458 where it is fluidized and is fed over the air slide 458 into the hopper section 463 of the powder feed hopper 450 and into feed chute 466. Air inlet 460 provides fluidizing air to a porous plate in air slide 458. Air slide 458 provides the important function of spreading out the resulting powder pile in hopper section 463 to achieve more storage volume in a limited size hopper. It also reduces the potential for material stratification due to the formation of a pile that would occur without the air slide. Air slide 458 accomplishes this with no moving mechanical parts.

Level control of powder in powder feed hopper 450 is provided by level sensors 462 and 464 of FIG. 8. Sensor 462 detects when the hopper section is full and does not allow any further transfers through inlets 452 and 454. Level sensor 464 detects when the hopper section is almost empty and stops any further transfers out of the hopper. By keeping a level of powder always at or above level sensor 464, the powder acts as an air seal to prevent any air from entering the laser sintering machine, which during operation is maintained under an inert atmosphere, such as nitrogen. The air seal also prevents the nitrogen atmosphere from escaping through the powder feed hopper 450. Powder to be fed into the sintering machine is precisely metered by the rotation of cylindrical powder roller 470, in conjunction with roller feeder 468, as seen in FIG. 8. The spacing between feeder 468 and roller 470 allows a precise amount of powder to be transferred down feed chute 466 and through feed gap 474 as powder roller 470 turns. A preferred roller is one with a smooth surface that has a linear relation between roller rotation and powder feed and with no pockets that could collect powder. Control mechanism 472 acts to periodically lift feeder 468 to clear agglomerates from the spacing between roller feeder 468 and roller 470. Once powder falls through feed gap 474 into the laser sintering process chamber it is then spread across the build area. The method for depositing and spreading powder in both directions in this approach is described completely in the aforementioned U.S. patent application Ser. No. 10/856,303.

The automated powder recycle system of the instant invention enables unmanned operation of more than one sintering machine in a 24 hour per day operation. Accordingly remote monitoring and diagnostics should be a key attribute of such a system. Another aspect of the instant invention is thus a remote HTML browser application so that Internet Explorer, Netscape, or another browser can be used to access the system remotely and perform system functions. These system functions can include at least additional blending, emptying of vessels, powder transfers, addition of virgin powder, etc. A remote HTML status screen is also available to display recycle system operating parameters including at least pressures, flow rates, transporter status, etc. An analog display shows powder levels in the various vessels and predicts when the different categories or types of powders are likely to run out using present usage rates. The same system is programmed to e-mail the system operator when virgin or recovered powder is running low.

While the invention has been described above with references to specific embodiments thereof, it is apparent that many changes, modifications and variations in the materials, arrangements of parts and steps can be made without departing from the inventive concept disclosed herein. Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A laser sintering powder recycle system comprising:
   (a) a laser sintering machine in which a layerwise build process is performed to produce at least one three-dimensional object, the laser sintering machine comprising a dense phase conveying device for transferring an amount of overflow powder from a receiving device within the laser sintering system directly to a powder feed hopper within the laser sintering system, wherein the overflow powder is kept within the laser sintering system;
   (b) a breakout station for receiving a part cake that includes the three-dimensional object from the laser sintering machine and an amount of unfused powder surrounding the three-dimensional object, the breakout station comprising a separation device for separating the unfused powder into recovered powder and spent powder and further comprising a dense phase conveying device for transferring the recovered powder from the breakout station to the powder feed hopper of the laser sintering system;
(c) a virgin powder supply from which virgin powder is transferred to the powder feed hopper of the laser sintering system; and
(d) a powder processing unit that comprises:
(i) a recovered powder inlet for receiving the recovered powder from the breakout station;
(ii) a virgin powder inlet for receiving the virgin powder from the virgin powder supply;
(iii) a blender vessel for blending and storing combinations of recovered powder and virgin powder; and
(iv) a dense phase conveying device for transferring the combined recovered and virgin powder from the blender vessel to the powder feed hopper of the laser sintering machine.

2. A system according to claim 1 wherein the virgin powder supply is in flow communication with a dense phase conveying device for transferring the virgin powder from the virgin powder supply to the powder processing unit.

3. A system according to claim 1 wherein the powder processing unit comprises a virgin powder storage vessel into which virgin powder is transferred from the virgin powder supply.

4. A system according to claim 3 wherein the virgin powder storage vessel comprises a cone in cone blender device.

5. A system according to claim 3 wherein a dense phase conveying device transfers the virgin powder in the virgin powder storage vessel to the blender vessel.

6. A system according to claim 1 wherein the powder processing unit comprises a recovered powder storage vessel that stores and blends quantities of recovered powder.

7. A system according to claim 6 wherein the recovered powder storage vessel comprises a weighing device to accurately weigh the powder contained in the vessel.

8. A system according to claim 1 wherein the blender vessel comprises a weighing device to accurately weigh the powder contained in the vessel.

9. A breakout station for use with a laser sintering machine in which a layerwise build process is performed to produce at least one three-dimensional object from powder deposited by a powder feed hopper, the breakout station comprising:
(a) a worktable for receiving a part cake that includes the three-dimensional object from the laser sintering machine and an amount of unfused powder surrounding the three-dimensional object;
(b) a separation device for separating the unfused powder into recovered powder and spent powder; and
(c) a dense phase conveying system for transferring the recovered powder from the separation device to powder feed hopper,
wherein the breakout station further comprises a screw feeder to feed the unfused powder from the worktable to the separation device and wherein the dense phase conveying system is in flow communication with a powder processing unit that blends the recovered powder with a virgin powder before transferring the blended powder to the powder feed hopper.

* * * * *